No. 637,957.  
W. F. DAVIS.  
GRINDING MILL.  
(Application filed July 8, 1899.)  
Patented Nov. 28, 1899.

(No Model.)  
3 Sheets—Sheet 1.

Witnesses:  
Inventor:  
Wm. F. Davis  
By his Attorneys.

No. 637,957. Patented Nov. 28, 1899.
W. F. DAVIS.
GRINDING MILL.
(Application filed July 8, 1899.)
(No Model.) 3 Sheets—Sheet 2.

Witnesses:

Inventor:
Wm. F. Davis
By Price & Fisher
his Attorneys.

No. 637,957. Patented Nov. 28, 1899.
W. F. DAVIS.
GRINDING MILL.
(Application filed July 8, 1899.)

(No Model.) 3 Sheets—Sheet 3.

Witnesses:

Inventor:
Wm. F. Davis
By Prinn & Fisher
his Attorneys

UNITED STATES PATENT OFFICE.

WILLIAM F. DAVIS, OF WATERLOO, IOWA.

GRINDING-MILL.

SPECIFICATION forming part of Letters Patent No. 637,957, dated November 28, 1899.

Application filed July 8, 1899. Serial No. 723,124. (No model.)

*To all whom it may concern:*

Be it known that I, WILLIAM F. DAVIS, a resident of Waterloo, in the county of Black Hawk, State of Iowa, have invented certain new and useful Improvements in Grinding-Mills, of which the following is a full, clear, and exact description.

This invention has relation to that class of grinding-mills commonly termed "feed-grinders" because of their special adaptability for the grinding of corn or other like grain to be used as food for stock, and more particularly does the invention relate to that class of feed-grinding mills (commonly known as "duplex" mills) in which two sets of burs or grinding-rings are employed for the grinding of the grain.

The invention has for its objects primarily to provide a mill of increased capacity, of lighter draft in proportion to the amount of work of which the mill is capable, of increased durability and greater efficiency of operation, together with cheapness in cost of manufacture; and these various objects are accomplished by the novel features of improvement hereinafter described, illustrated in the accompanying drawings, and particularly pointed out in the claims at the end of the specification.

Figure 1:
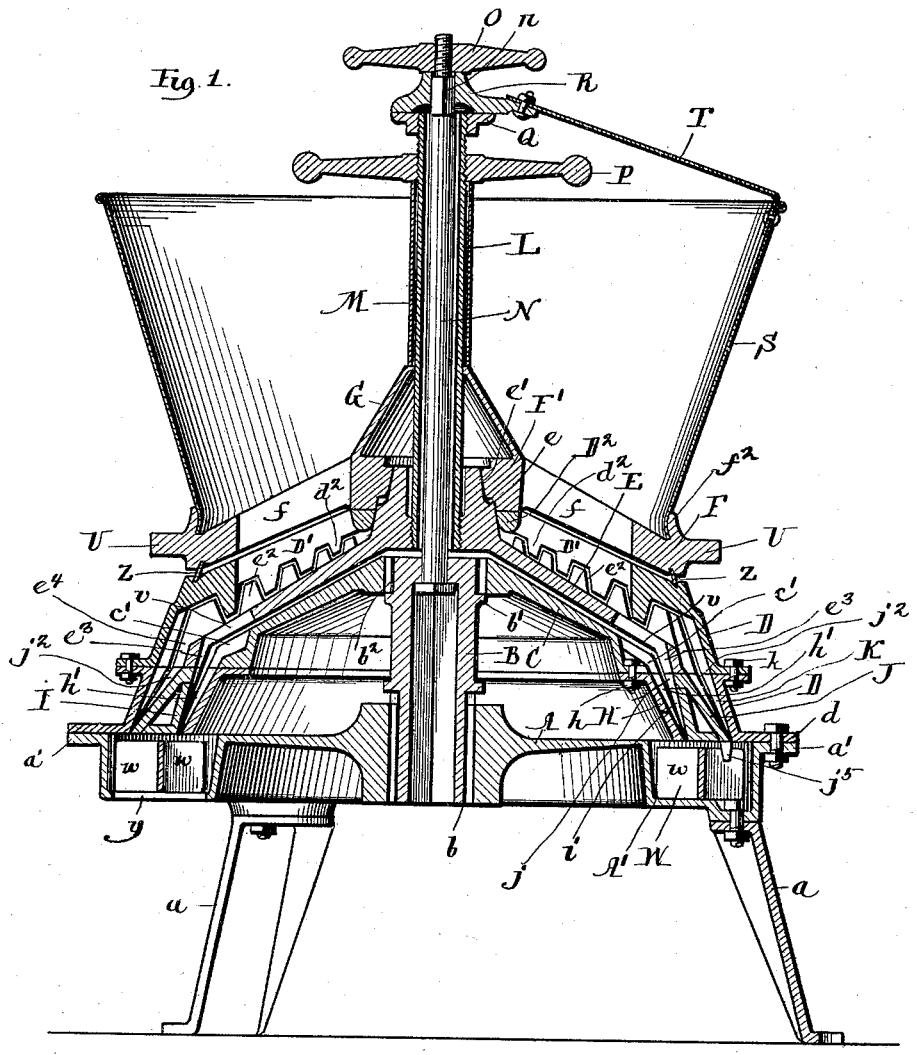
Figure 2:
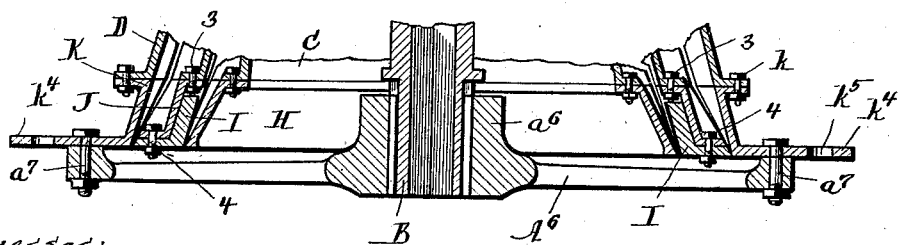
Figure 3:
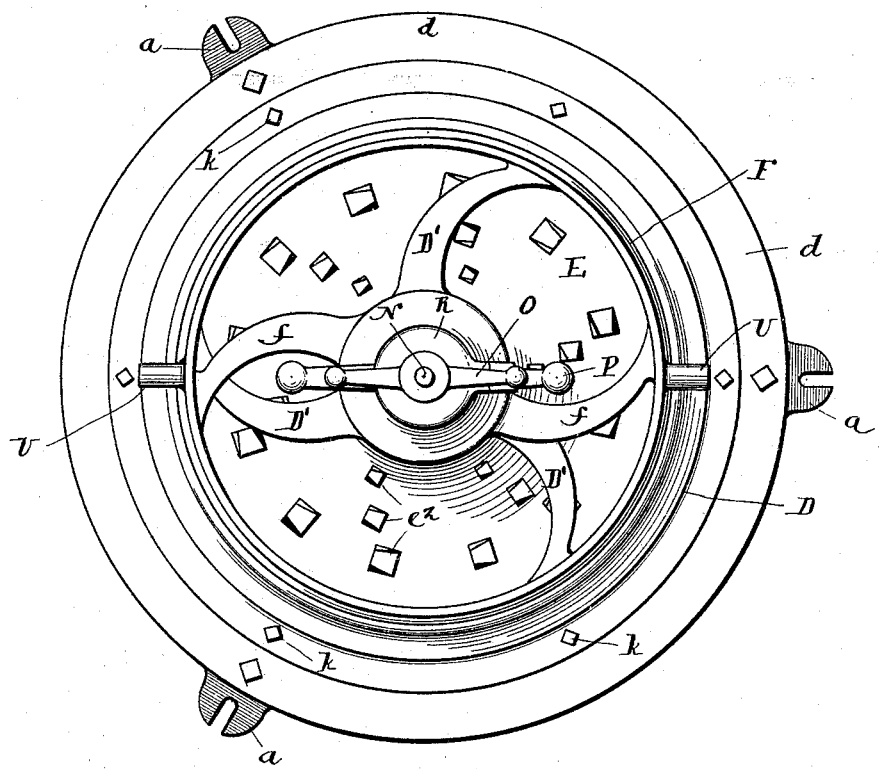
Figure 4:
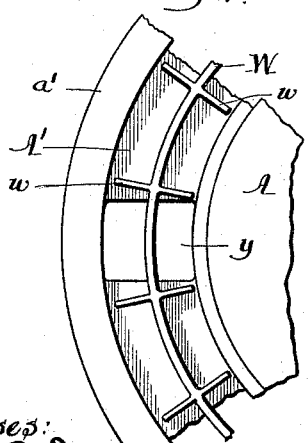
Figure 5:
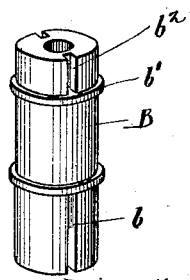
Figure 6:
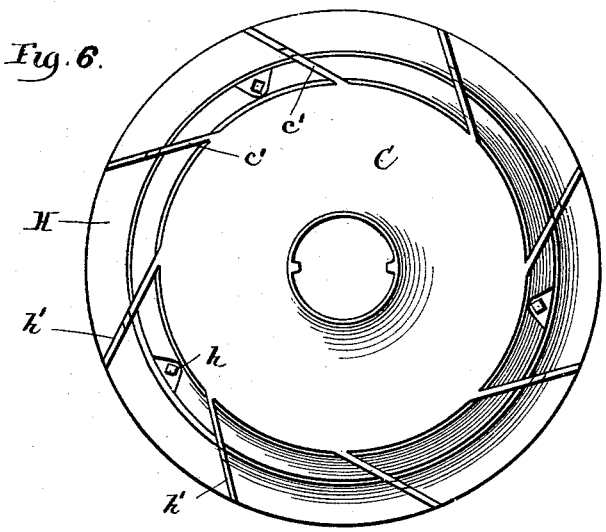
Figure 7:
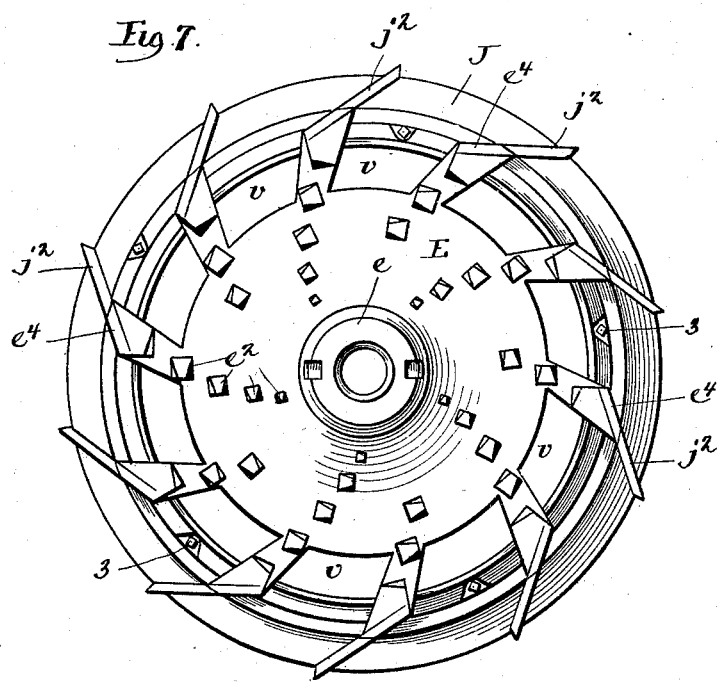

Figure 1 is a view in central vertical section through a mill embodying my invention. Fig. 2 is a detail view in vertical section through the two sets of grinding-rings or burs, a modified form of support being shown. Fig. 3 is a plan view with the hopper removed. Fig. 4 is a detail plan of a part of the base and of the conveyer. Fig. 5 is a detail perspective view of the post between the cone and base. Fig. 6 is a detail plan view of the cone. Fig. 7 is a detail plan view of the cone-shell.

Referring to the accompanying drawings, A designates the base of the mill, this base being preferably of cast metal supported upon suitable legs $a$, bolted thereto. The base A is formed centrally with an opening to receive the supporting-post B, this post being cast with suitable grooves $b$ to interlock with the base and guard the post against rotation. The post B is also formed with annular ribs $b'$, and the top of the post B serves to support the inner cone C, through the central opening of which the upper end of the post B extends. The central opening of the cone C is furnished with ribs to enter vertical grooves $b^2$, that are formed in the post B. The base A is shown as formed with offset lugs or flanges $a'$, to which are bolted the laterally-projecting base-flanges $d$ of the outer shell D. As shown, the shell D is formed of upper and lower horizontal sections, the purpose of which will hereinafter appear, and the upper part of the shell D is connected by arms D′ with a central hub $D^2$, that loosely encircles the conical hub or post $e$, that rises centrally from the top of the cone-shell E. Above the outer shell D extends the annular cob-breaker ring F, that is connected by cob-breaker arms $f$ with a central hub F, that is suitably keyed to the upper portion $e'$ of the central post $e$ of the cone E or is otherwise suitably connected therewith. Between the cob-breaker ring F and the upper part of the shell D extends a guard-ring or annular plate Z, that serves to prevent the escape of grain at such point, as will presently more fully appear.

Within the upwardly-projecting annular flange $f^2$ of the cob-breaker ring F extends the lower edge of the hopper S, this hopper being preferably retained against rotation in the manner to be presently described. From the hub F′ rises a conical portion G, upon the top of which rests the lower end of a plain sleeve or cylinder M, the upper end of this sleeve or cylinder forming a bearing or support for the hub of an adjusting hand-wheel P, that is threaded and engages a correspondingly-threaded portion of a supporting-sleeve L, or, if preferred, the sleeve M might be formed in piece with the hub of the hand-wheel P. The lower end of the sleeve L is united, preferably by a screw-threaded joint, to the hub $e$ of the intermediate cone-shell E. It will thus be seen that the cob-breaker ring F and the parts integral therewith are sustained by the guard-ring Z and the shell D. So, also, the intermediate cone-shell E is sustained by means of the sleeve L, the hand-wheel P, the sleeve M, and the conical extension G of the hub F′. Manifestly, therefore, when it is desired to adjust the cone-shell E toward or from the shell D in order to vary the extent to which the grain will be ground as it passes between the burs or grinding-rings at the base of the cone E and shell D such adjustment can be readily effected by turning the hand-wheel P, so as to move the cone-shell E nearer to or farther from the shell D. The inner cone C and the grinding-ring or bur carried thereby are supported by the post B, which in turn is sustained by the rod N, the lower headed end of which engages the upper end of the post B. The rod N extends upwardly through the sleeve L, and the upper end of this rod N is threaded and is engaged by a correspondingly-threaded adjusting hand-bar O. Beneath the hand-bar O and loosely engaging the squared upper portion $n$ of the rod is placed a washer R, that rests upon a supporting-collar Q, that is fixedly united (preferably by screw-threads) to the upper threaded end of the sleeve L. Hence it will be seen that the inner cone C is sustained through the medium of the post B, the rod N, the hand-bar O, the washer R, the collar Q, the sleeve L, the hand-wheel P, the sleeve M, the extension G, hub F', and cob-breaker ring F, and when it is desired to vary the grinding action—i. e., either coarser or finer—of the rings or burs carried by the cone C and upon the interior of the cone-shell E this can be done by turning the hand-bar O in order to raise or lower the rod N and correspondingly shift the cone C.

From the foregoing description it will be seen that in my improved mill an independent adjustment of the inner cone and intermediate cone-shell can be readily effected, so that the grinding of the grain to any degree of fineness or coarseness as it passes between the inner or outer sets of grinding-rings or burs can be easily and exactly controlled. Another most important advantage incident to my invention is that inasmuch as the cone C and cone-shell E are sustained from the outer shell, which is rigidly supported by the base or other suitable support, the riding or rubbing of the grinding-ring at the base of the outer shell against the opposing grinding-ring of the cone-shell is entirely avoided. The manner of supporting the cone, the cone-shell, and the outer shell enables the independent adjustment of the cone and the cone-shell, thereby not only allowing the easy and effective regulation of the grinding action of the burs, but also avoiding the wear of parts and by so much lengthening the life of the machine.

In small feed-mills it is desirable, to prevent the clogging of the hopper by ears of corn or the like, that the hopper should be held stationary instead of revolving with the cob-breaker ring F, and to thus retain the hopper in stationary position I unite the upper edge of the hopper preferably to the stationary washer R by means of one or more rods T, the ends of which are bolted, respectively, to the rim of the hopper and to the washer. I have shown the cob-breaker ring F as formed with projecting studs U, to which will be fastened the ends of the usual sweep for the attachment of horses to operate the mill. It will be manifest, however, that features of my invention will be applicable to mills of this general class whether they be driven directly by a sweep, as above described, or by suitable gearing from a source of power.

By reference more particularly to Figs. 1, 2, and 7 it will be seen that the upper surface of the cone-shell E is formed with a series of upwardly-projecting teeth $e^2$, and these teeth $e^2$ coöperate with similar teeth $d^2$, depending from the arms D' of the shell D. It will be seen also that the lower part of the shell C is formed by the grinding-ring H bolted thereto, as at $h$, and the lower part of the cone C and the periphery of the grinding-ring H are formed with corresponding teeth $c'$ and $h'$, so arranged as to force downwardly the grain as it is being ground. It will be observed that the grinding-ring H and the lower edge of the cone C are flanged to afford convenient points of attachment for the connecting-bolt $h$. Heretofore it has been the practice in mills of this character to have the grinding-ring of such size that it will set over and be sustained by the periphery of the lower part of the cone C, and it is obvious that by forming the grinding-ring H as an extension of and depending from the lower part of the cone C a material saving in cost of manufacture is effected. By reference also to Figs. 1 and 2 it will be seen that the grinding-rings I and J, carried by the cone-shell E, are bolted to and depend from the lower edge of such part. The inner face of the lower part of the cone-shell E and the interior of the upper part of the ring J are formed with teeth $e^3$ and $j$, that coincide with the grinding-teeth $i$ upon the interior of the ring I, and in like manner the exterior of the cone-shell E is formed with teeth $e^4$, that coincide with the teeth $j^2$, formed upon the exterior of the grinding-ring J. The grinding-ring J is attached by suitable bolts 3 to the lower edge of the cone-shell, and the inner face of the ring J is recessed to receive the grinding-ring I, the lower edge of the ring I being flanged to receive the bolts 4, that unite it to the base of the ring J. It will be observed that the lower part of the shell D constitutes an outer grinding-ring K, the teeth upon the inner face of which coincide with the teeth formed above them upon the interior of the shell. The lower part of the shell D, that constitutes the grinding-ring K, is formed with an upper flange that is attached by a suitable bolt $k$ to a corresponding flange projecting from the shell D. Aside from compactness and economy of construction there are other advantages (as in the casting of the teeth, &c.) incident to this manner of connecting the grinding-rings to the bottoms of the cone, the shell, and the cone-shell, as will readily be understood by those familiar with this class of mills. In the cone-shell E are formed the openings $v$, that permit the grain to pass down between the grinding-rings H and I, and it will be understood that these openings will be in suitable number and of such size as to insure the proper supply of grain to the inner set of grinders.

From the foregoing description it will be seen that when the material to be ground is placed within the hopper S and revolution is imparted to the cob-breaker ring F corresponding revolution will be given to the intermediate cone-ring E and the grinding-rings I and J, carried thereby, while the grinding-rings H and K remain stationary. As the grain passes from between the inner set of grinders H and I and from between the outer set of grinders J and K it will be received by an annular duplex conveyer W, that sits within an annular recess or depression A' of the base A. This conveyer W is shown as comprising a central web, with wings $w$ projecting therefrom, and revolution is imparted to the conveyer W by a lug or extension $j^5$, that extends downwardly from the grinding-ring J and engages one of the cross-wings of the conveyer. At a convenient point an opening Y is formed in the base A beneath the conveyer W in order to permit the discharge of grain therefrom. By providing a duplex conveyer—that is to say, a conveyer adapted to separately receive the ground grain as it issues from the outer and inner set of grinding-rings—the operator is enabled to readily inspect the work of each set of grinders and by the adjusting mechanism above described can regulate the grinders, so as to insure the proper grinding action of both sets of grinders. By sustaining the grinding-rings so that these rings never ride or rub together and in such manner that their adjustment can be readily effected it is obvious that coarse feed can be readily ground, or, as is sometimes desirable, corn may be allowed to pass without grinding.

Instead of employing a base A for supporting the superposed parts, as hereinbefore described, I may sustain these parts upon the ordinary feed-receiving box. In such case the lower part of the shell B will be formed with outwardly-extending lugs $k^4$, (see Fig. 2,) having holes $k^5$ to receive bolts for attachment to the grain-receiving box, and when the parts are thus sustained the central post B will be supported by a cross-bar $A^6$, having a hub $a^6$, the outer ends of the bar $A^6$ being bolted, as at $a^7$, to the lateral projecting flange $k^4$. The cross-bar $A^6$ thus performs the function of the base A and serves to hold the central post B and cone C against rotation.

It is manifest that while my invention is more particularly directed to the class of duplex feed-mills above described, still certain features of the invention may be used in other classes of mills and the details of construction above set out may be varied by the skilled mechanic without departing from the spirit of the invention.

Having thus described my invention, what I claim as new, and desire to secure by Letters Patent, is—

1. In a grinding-mill, the combination of two sets of grinding-rings or burs arranged out of vertical alinement, a base or support having an annular recess or channel extending beneath and concentric with said rings or burs and a duplex conveyer movably arranged within said annular channel or recess and adapted to receive the ground grain from each set of grinding-rings or burs.

2. In a grinding-mill the combination with a suitable base or support and with two sets of grinding-rings or burs supported above said base, of a duplex annular conveyer having a central vertical partition and lateral projecting wings, said central partition serving to insure the independent delivery of the ground feed from the two sets of grinding-rings or burs.

3. In a grinding-mill the combination with a suitable base or support, an outer shell rigidly sustained by said base or support, an inner cone, and an intermediate cone-shell hung from said outer shell, of means for independently adjusting said inner cone and said intermediate cone-shell while said outer shell remains in fixed position.

4. In a grinding-mill the combination with a suitable base or support, of an outer shell rigidly sustained by said base or support, an inner cone, a post engaging said cone and the base beneath it, means for sustaining said cone from the outer shell and an intermediate cone-shell also sustained from said outer shell.

5. In a grinding-mill the combination with a suitable base or support having a vertical opening therein, of a post vertically movable within said base-opening, an inner cone mounted upon the top of said post, an outer shell, an intermediate shell and suitable means for sustaining said cone and cone-shell from said outer shell.

6. In a grinding-mill the combination with a suitable base or support, of an outer shell, an inner cone and an intermediate cone-shell provided with two sets of grinding-rings or burs, of means for supporting said cone and said cone-shell from said outer shell, means whereby said cone may be adjusted with respect to said cone-shell and independent adjusting mechanism whereby said cone-shell may be adjusted with respect to said outer shell.

7. In a grinding-mill the combination with a suitable base or support, of an outer shell provided with a grinding-ring, an inner cone provided with a grinding-ring and an intermediate cone-shell provided with inner and outer grinding-rings or burs, means for supporting said inner cone from the outer shell and separate adjusting devices at the top of the mill whereby said inner cone and intermediate cone-shell may be independently adjusted.

8. In a grinding-mill the combination with a suitable base or support, an outer shell, an inner cone and an intermediate cone-shell, of a revoluble cob-breaker ring connected with the hub of said cone-shell for driving the same, a guard-ring arranged intermediate said cob-breaker ring and said outer shell, means for supporting said inner cone and said intermediate cone-shell from the hub of said cob-breaker ring, a hand-wheel and suitable adjunctive mechanism for adjusting said cone-shell with respect to said outer shell and an independent hand-wheel and adjunctive devices for adjusting said inner cone with respect to said intermediate cone-shell.

9. In a grinding-mill the combination with a suitable base or support, of an outer grinding-shell rigidly connected to said base or support and provided with a grinding-ring, a revoluble cob-breaker ring mounted above said outer shell, an intermediate cone-shell connected with and driven by said cob-breaker ring and provided with inner and outer grinding-rings, an inner cone provided with a grinding-ring, an adjusting-rod suitably connected with and serving to adjustably support said inner cone and provided with an adjusting wheel or nut, a threaded sleeve encircling said adjusting-rod and serving to support said cone-shell and provided with an independent adjusting wheel or nut and a suitable sleeve or support whereby said last-named wheel is sustained from the hub of the cob-breaker ring.

WILLIAM F. DAVIS.

Witnesses:
GEO. P. FISHER, Jr.,
ALBERTA ADAMICK.